United States Patent
Marupaduga

(10) Patent No.: US 11,252,646 B1
(45) Date of Patent: Feb. 15, 2022

(54) WIRELESS DATA SERVICE DELIVERY OVER WIRELESS REPEATERS

(71) Applicant: T-MOBILE INNOVATIONS LLC, Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 57 days.

(21) Appl. No.: 16/906,356

(22) Filed: Jun. 19, 2020

(51) Int. Cl.
| | |
|---|---|
| H04W 4/00 | (2018.01) |
| H04W 48/16 | (2009.01) |
| H04W 48/14 | (2009.01) |
| H04W 76/15 | (2018.01) |
| H04W 16/26 | (2009.01) |
| H04B 7/155 | (2006.01) |
| H04B 17/318 | (2015.01) |
| H04W 76/14 | (2018.01) |

(52) U.S. Cl.
CPC ........ H04W 48/16 (2013.01); H04B 7/15514 (2013.01); H04B 17/318 (2015.01); H04W 16/26 (2013.01); H04W 48/14 (2013.01); H04W 76/14 (2018.02); H04W 76/15 (2018.02)

(58) Field of Classification Search
CPC ..... H04W 48/16; H04W 76/15; H04W 76/14; H04W 16/26; H04W 48/14; H04B 17/318; H04B 7/15514
USPC ........................................ 370/329, 422, 381
See application file for complete search history.

(56) References Cited

U.S. PATENT DOCUMENTS

| | | | |
|---|---|---|---|
| 7,480,486 B1 | 1/2009 | Oh et al. | |
| 8,160,501 B1 * | 4/2012 | Hyde | H04B 7/15578 455/67.14 |
| 8,243,641 B2 | 8/2012 | Kim | |
| 8,462,688 B1 | 6/2013 | Dinan | |
| 8,831,615 B2 | 9/2014 | Wei | |
| 9,066,329 B2 | 6/2015 | Maeda et al. | |
| 9,392,599 B2 | 7/2016 | Maeda et al. | |
| 10,021,521 B1 * | 7/2018 | Reeves | H04W 84/005 |
| 10,154,500 B2 | 12/2018 | Dinan | |
| 10,341,924 B2 | 7/2019 | Huang et al. | |
| 10,959,235 B2 * | 3/2021 | Ali | H04W 88/08 |
| 11,129,069 B1 * | 9/2021 | Marupaduga | H04W 36/06 |
| 2014/0308043 A1 * | 10/2014 | Heidler | H04B 10/808 398/115 |

(Continued)

*Primary Examiner* — Marceau Milord

(57) ABSTRACT

A wireless communication network serves a wireless User Equipment (UE) with a wireless data service over wireless repeaters. A serving access node wirelessly receives UE signaling that indicates signal strengths for the wireless repeaters. The serving access node determines amounts of the wireless repeaters between the wireless UE and individual target access nodes. The serving access node selects a primary access node from the target access nodes based on the signal strengths and the wireless repeater amounts. The serving access node responsively transfers network signaling to the primary access node. The primary access node receives the network signaling and responsively serves the wireless UE with the wireless data service. The primary access node transfers additional network signaling to a secondary access node. The secondary access node receives the additional network signaling and responsively serves the wireless UE with the wireless data service.

18 Claims, 11 Drawing Sheets

(56) References Cited

U.S. PATENT DOCUMENTS

| | | | |
|---|---|---|---|
| 2016/0191165 A1* | 6/2016 | Nisan | H04B 10/60 |
| | | | 398/115 |
| 2017/0013547 A1* | 1/2017 | Skaaksrud | H04B 17/318 |
| 2017/0244474 A1* | 8/2017 | Ijaz | H04B 7/2606 |
| 2017/0337813 A1* | 11/2017 | Taylor | G08G 1/0965 |
| 2019/0319814 A1* | 10/2019 | Das | H04W 16/14 |
| 2020/0280365 A1* | 9/2020 | Abedini | H04W 52/46 |
| 2020/0344813 A1* | 10/2020 | Li | H04W 56/001 |
| 2021/0297442 A1* | 9/2021 | Vasseur | H04L 63/0263 |

* cited by examiner

WIRELESS DATA SERVICE DELIVERY OVER WIRELESS REPEATERS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), and Low-Power Wide Area Network (LP-WAN). In some examples, both LTE and 5GNR networks serve the same wireless user device at the same time with an integrated data service called dual-connectivity.

The wireless communication networks use wireless repeaters to extend the coverage of their wireless data services. A wireless repeater wirelessly receives a downlink signal from a wireless access node and wirelessly transmits a clean version of the downlink signal to wireless user devices or other wireless repeaters. The wireless repeater wirelessly receives an uplink signal from wireless user devices or other wireless repeaters and wirelessly transmits a clean version of the uplink signal to wireless access nodes or other wireless repeaters. Although the wireless repeaters extend the wireless data service coverage, the wireless repeaters also delay the user data communications and may degrade the wireless data service. The wireless communication networks do not efficiently control the use of wireless repeaters by the wireless user devices.

TECHNICAL OVERVIEW

A wireless communication network serves a wireless User Equipment (UE) with a wireless data service over wireless repeaters. A serving access node wirelessly receives UE signaling that indicates signal strengths for the wireless repeaters. The serving access node determines amounts of the wireless repeaters between the wireless UE and individual target access nodes. The serving access node selects a primary access node from the target access nodes based on the signal strengths and the wireless repeater amounts. The serving access node responsively transfers network signaling to the primary access node. The primary access node receives the network signaling and responsively serves the wireless UE with the wireless data service. The primary access node transfers additional network signaling to a secondary access node. The secondary access node receives the additional network signaling and responsively serves the wireless UE with the wireless data service.

DETAILED DESCRIPTION

Figure 1:
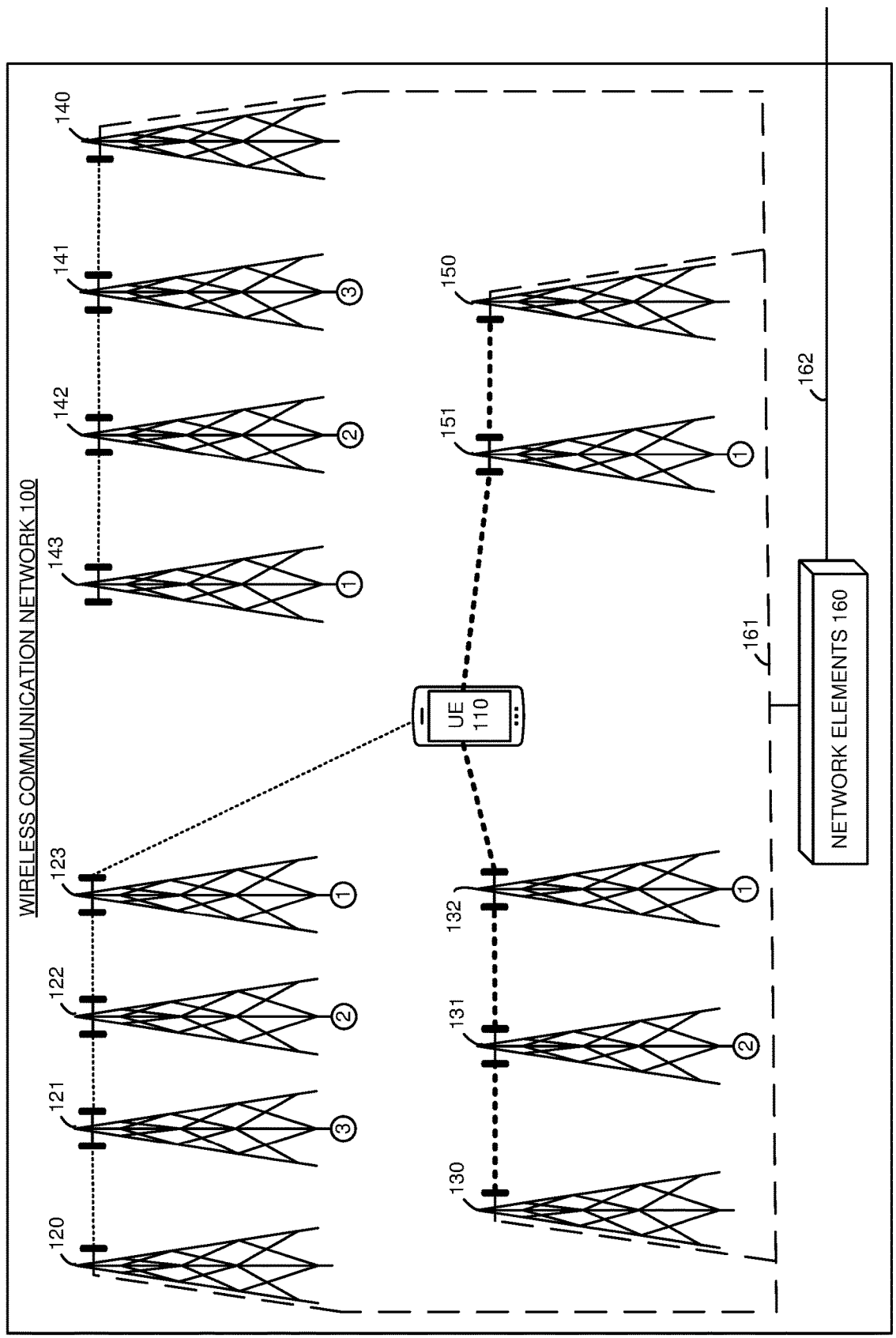
FIG. 1 illustrates a wireless communication network to serve a wireless User Equipment (UE) with a wireless data service over wireless repeaters.

FIG. 1 illustrates wireless communication network 100 to serve wireless User Equipment (UE) 110 with a wireless data service over wireless repeaters 121-123, 131-132, 141-143, and 151. The wireless data service comprises internet-access, machine-control, media-conferencing, or some other wireless network product. Wireless communication network 100 comprises wireless UE 110, wireless repeaters 121-123, 131-132, 141-143, and 151, wireless access nodes 120, 130, 140, and 150, and network elements 160. UE 110 may wirelessly communicate with wireless access node 120 over wireless repeaters 121-123. UE 110 may wirelessly communicate with wireless access node 130 over wireless repeaters 131-132. UE 110 may wirelessly communicate with wireless access node 140 over wireless repeaters 141-143. UE 110 may wirelessly communicate with wireless access node 150 over wireless repeater 151. Wireless access nodes 120, 130, 140, and 150 communicate with network elements 160 over backhaul links 161. Network elements 160 communicate with external systems over data links 162.

Various examples of network operation and configuration are described herein. In one example, UE 110 initially attaches to wireless access node 120 over wireless repeaters 121-123—typically based on repeater 123 having the best signal strength at UE 110. Wireless access node 120 comprises the "serving" access node for UE 110, and wireless access nodes 120, 130, 140, and 150 comprise the "target" access nodes for UE 110. UE 110 reports the signal strength for repeaters 123, 132, 143, and 151 to wireless access node 120. Wireless access node 120 wirelessly receives UE signaling from UE 110 that has the reports of the signal strengths. Wireless access node 120 determines the number of wireless repeaters between UE 110 and target access node 120 (3). Wireless access node 120 determines the numbers of wireless repeaters between UE 110 and target access node 130 (2). Wireless access node 120 determines the numbers of wireless repeaters between UE 110 and target access node 140 (3). Wireless access node 120 determines the numbers of wireless repeaters between UE 110 and target access node 150 (1). Wireless access node 120 selects a "primary" access node from the set of target access nodes 120, 130, 140, and 150 based on the reported signal strengths and the determined wireless repeater amounts. Typically, the target access node with adequate signal strength and the fewest repeaters is selected.

In this example, serving wireless access node 120 selects target wireless access node 150 as the primary access node, because target access node 150 has adequate signal strength and the fewest amount of repeaters (1). Note that serving access node 120 may select itself as the primary access node in other examples where it may have adequate signal strength and the fewest number of repeaters. Serving wireless access node 120 transfers network signaling to primary wireless access node 150 and to UE 110 that directs UE 110 to attach to wireless access node 150 over repeater 151. UE 110 usually detaches from wireless access node 120 at this point.

Wireless access node 150 receives the network signaling and responsively serves UE 110 with the wireless data service over wireless repeater 151. Wireless access node 150 receives the signal strength reports from UE 110 and selects a secondary access node to serve UE 110—perhaps based its signal strength and repeater amount. In this example, wireless access node 150 selects wireless access node 130 as a secondary access node because node 130 has adequate signal strength and the next lowest number of repeaters. Wireless access node 150 transfers network signaling to wireless access node 130 and UE 110 directing UE 110 to attach to wireless access node 130 over repeaters 131-132. Wireless access node 130 receives the network signaling and responsively serves UE 110 with the wireless data service over repeaters 131-132.

For clarity, other UEs are not shown on FIG. 1. In some examples, wireless access node 110 determines amounts of these other UEs that are directly served by individual access nodes 120, 130, 140, and 150 (not served through a repeater). Wireless access node 110 determines amounts of UEs that are indirectly served by individual access nodes 120, 130, 140, and 150 (served through a repeater). Serving wireless access node 120 may select the primary access node based on the signal strengths, repeater amounts, and UE amounts. The UE amounts may be the amount of directly served UEs, indirectly served UEs, or the sum of both amounts.

In some examples, serving access node 120 may determine performance metrics for other UEs that are directly served by the individual serving and target access nodes 120, 130, 140, and 150. Serving access node 120 may determine performance metrics for the UEs that are indirectly served by individual serving and target access nodes serving and target access nodes 120, 130, 140, and 150 over wireless repeaters 121-123, 131-132, 141-143, and 151. Serving access node 120 may select the primary access node based on the signal strengths, repeater amounts, UE amounts, and performance metrics.

In some examples, serving access node 120 determines velocity for wireless UE 110. Serving access node 120 also determines individual antenna characteristics for the individual repeaters 123, 132, 143, and 151. Exemplary antenna characteristics include numbers of antenna elements, antenna rank, and the like. When the UE velocity exceeds a threshold, serving access node 120 selects the primary access node based on the strength, repeater amounts, and individual antenna characteristics. For highly mobile UEs, the wireless repeater with more antenna elements, minimal serving repeaters, and an adequate signal strength is typically selected.

The wireless communication links in wireless communication network 100 use electromagnetic frequencies in the low-band, mid-band, high-band, or some other portion of the electromagnetic spectrum. The wireless links use protocols like Fifth Generation New Radio (5GNR), Long Term Evolution (LTE), Institute of Electrical and Electronic Engineers (IEEE) 802.11 (WIFI), Low-Power Wide Area Network (LP-WAN), Millimeter Wave (MMW) and/or some other format. Backhaul links 161 between the access nodes and networks elements use metal, glass, air, or some other media. Backhaul links 161 use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols. External links 162 are similar to backhaul links 161.

Although UE 110 is depicted as a smartphone, UE 110 might instead comprise a computer, robot, vehicle, or some other data appliance with wireless communication circuitry. The wireless access nodes and repeaters in network 100 are shown mounted on towers, but these nodes/repeaters may use other mounting structures or no mounting structure at all. UE 110, node 120, node 130, node 140, node 150, repeaters 120-124, repeaters 130-132, repeaters 140-143, and repeaters 150-151 comprise antennas, amplifiers, filters, modulation, analog/digital interfaces, microprocessors, software, memories, transceivers, bus circuitry, and the like. Network elements 160 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein. Exemplary network elements 160 comprise User Plane Functions (UPF), Access and Mobility Management Functions (AMF), Serving Gateways (SGW), Mobility Management Entities (MME), System Architecture Evolution Gateways (SAE GW), and/or some other network apparatus.

For clarity, other UEs are not shown on FIG. 1. In some examples, wireless access node 110 determines amounts of these other UEs that are directly served by individual access nodes 120, 130, 140, and 150 (not served through a repeater). Wireless access node 110 determines amounts of UEs that are indirectly served by individual access nodes 120, 130, 140, and 150 (served through a repeater). Serving wireless access node 120 may select the primary access node based on the signal strengths, repeater amounts, and UE amounts. Typically, the target access node with adequate signal strength, few repeaters, and a low UE amount selected. The UE amounts may be the amount of directly served UEs, indirectly served UEs, or the sum of both amounts.

In some examples, serving access node 120 may determine performance metrics for other UEs that are directly served by the individual serving and target access nodes 120, 130, 140, and 150. Serving access node 120 may determine performance metrics for the UEs that are indirectly served by individual serving and target access nodes serving and target access nodes 120, 130, 140, and 150 over wireless repeaters 121-123, 131-132, 141-143, and 151. Performance metrics comprise data throughput, packet latency, error rate, or some other communication measurement. Serving access node 120 may select the primary access node based on the signal strengths, repeater amounts, UE amounts, and performance metrics. Target access nodes with poor UE performance are avoided.

In some examples, serving access node 120 determines velocity for wireless UE 110. The velocity can be determined through triangulation, UE location report, and the like. Serving access node 120 also determines individual antenna characteristics for the individual repeaters 123, 132, 143, and 151. Exemplary antenna characteristics include numbers of antenna elements, antenna rank, and the like. When the UE velocity exceeds a threshold, serving access node 120 selects the primary access node based on the strength, repeater amounts, and individual antenna characteristics. For highly mobile UEs, the wireless repeater with more antenna elements, minimal serving repeaters, and an adequate signal strength is typically selected.

Figure 2:
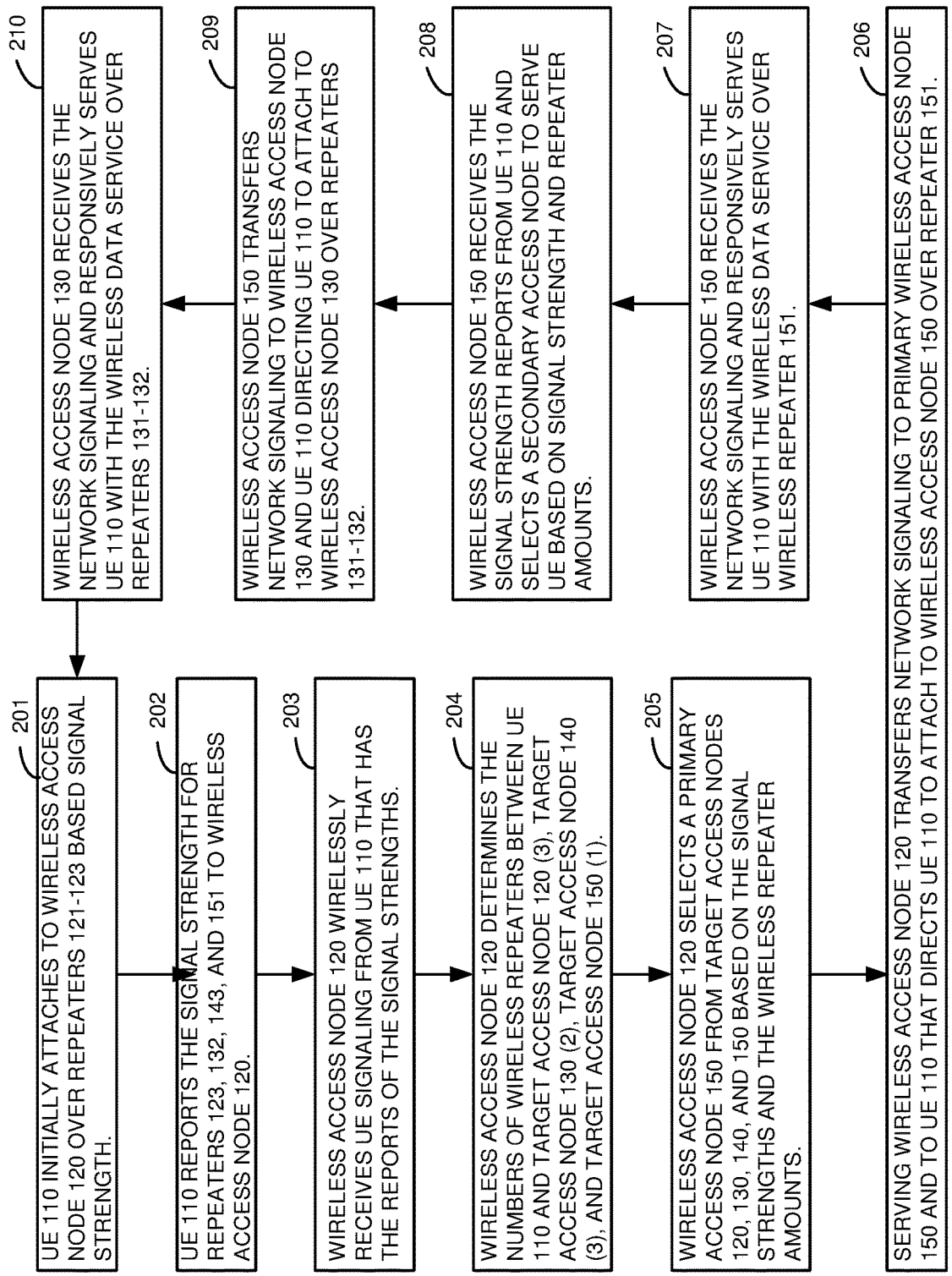
FIG. 2 illustrates an exemplary operation of the wireless communication network to serve the wireless UE with the wireless data service over the wireless repeaters.

FIG. 2 illustrates an exemplary operation of wireless communication network 100 to serve wireless UE 110 with the wireless data service over wireless repeaters 121-123, 131-132, 141-143, and 151. UE 110 initially attaches to serving wireless access node 120 over repeaters 121-123 based repeater signal strength (201). UE 110 reports the signal strength for repeaters 123, 132, 143, and 151 to wireless access node 120 (202). Wireless access node 120 wirelessly receives UE signaling from UE 110 that has the reports of the signal strengths (203). Wireless access node 120 determines the numbers of wireless repeaters between UE 110 and target access node 120 (3), target access node 130 (2), target access node 140 (3), and target access node 150 (1) (204). In this example, serving wireless access node 120 selects primary wireless access node 150 based its adequate signal strength and its fewest amount of repeaters (1) (205). Serving wireless access node 120 transfers network signaling to primary wireless access node 150 and to UE 110 that directs UE 110 to attach to wireless access node 150 over repeater 151 (206).

Wireless access node 150 receives the network signaling and responsively serves UE 110 with the wireless data service over wireless repeater 151 (207). Wireless access node 150 receives the signal strength reports from UE 110 and selects secondary access node 130 to serve UE 110 based on adequate signal strength and repeater amount (2) (208). Wireless access node 150 transfers network signaling to wireless access node 130 and UE 110 directing UE 110 to attach to wireless access node 130 over repeaters 131-132 (209). Wireless access node 130 receives the network signaling and responsively serves UE 110 with the wireless data service over repeaters 131-132 (210).

Figure 3:
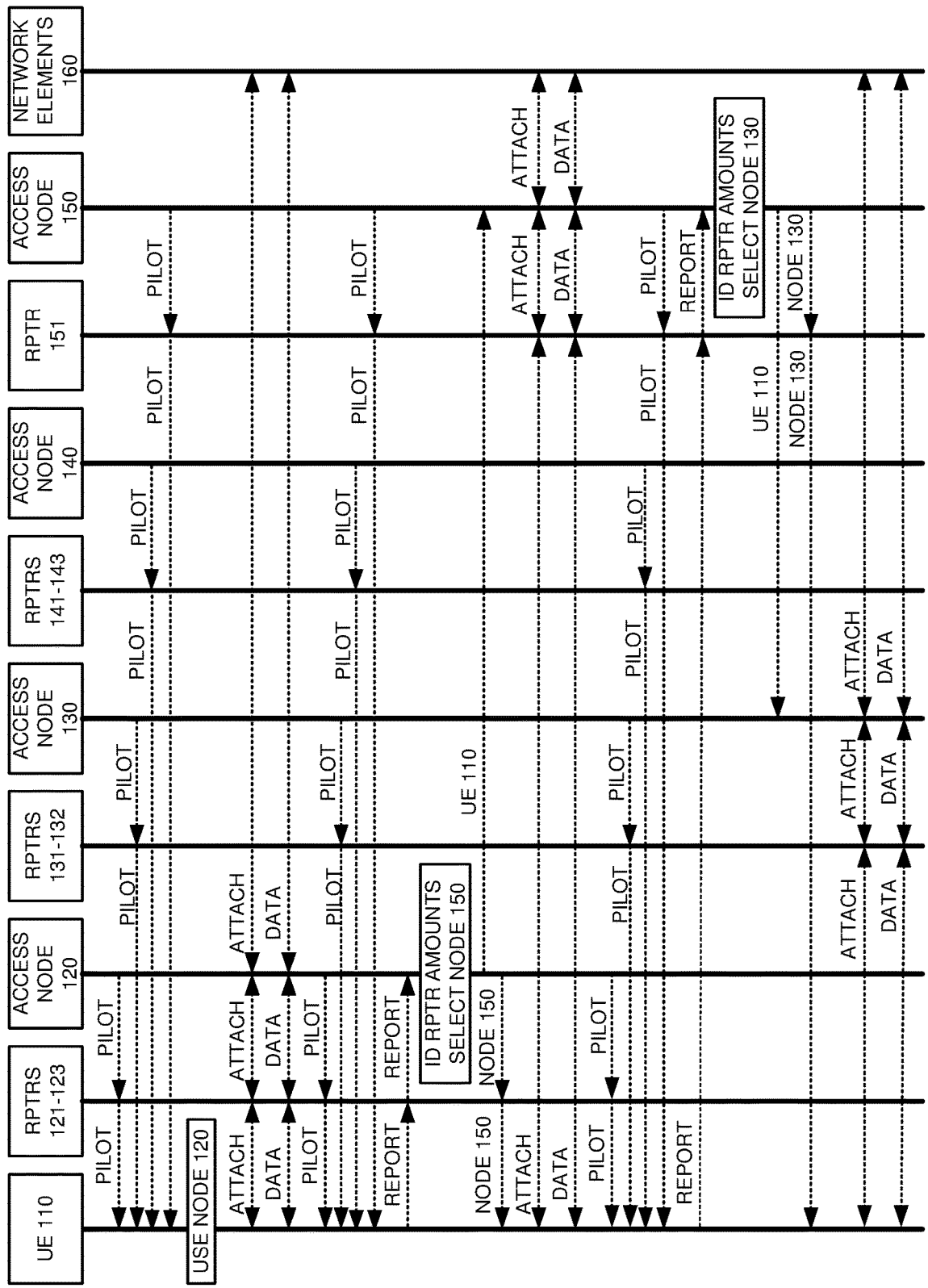
FIG. 3 illustrates an exemplary operation of the wireless communication network to serve the wireless UE with the wireless data service over the wireless repeaters.

FIG. 3 illustrates an exemplary operation of the wireless communication network 100 to serve wireless UE 110 with the wireless data service over wireless repeaters 121-123, 131-132, 141-143, and 151. Wireless access nodes 120, 130, 140, and 150 broadcast pilot signals. Wireless repeaters 121-123, 131-132, 141-143, and 151 wirelessly receive and re-transmit the pilot signals. UE 110 receives the pilot signals from repeaters 123, 132, 143, and 151. UE 110 selects the pilot signal from wireless repeaters 121-123 and access node 120 based on signal strength. UE 110 attaches to wireless access node 120 over repeaters 121-123. Wireless access node 120 attaches UE 110 to network elements 160. Wireless access node 120 and network elements 160 exchange user data to deliver the wireless data service to UE 110. Wireless access node 120 and repeaters 121-123 wirelessly exchange the user data to serve the wireless data service to UE 110. Wireless repeater 121 and UE 110 wirelessly exchange the user data to serve the wireless data service to UE 110.

Wireless access nodes 120, 130, 140, and 150 continue broadcast pilot signals. Wireless repeaters 121-123, 131-132, 141-143, and 151 continue to wirelessly receive and re-transmit the pilot signals. UE 110 continues to receive the pilot signals. UE 110 reports the signal strengths to wireless access node 120 over wireless repeaters 121-123. Wireless access node 120 identifies numbers of wireless repeaters between UE 110 and access node 120 (3), access node 130 (2), access node 140 (3), and access node 150 (1). Wireless access node 120 selects access node 150 as the primary node based on its adequate signal strength and lowest repeater amount (1). Wireless access node 120 signals the selection to wireless access node 150 and UE 110. UE 110 attaches to primary wireless access node 150 over wireless repeater 151. UE 110 detaches from repeaters 121-123 and access node 120. Wireless access node 150 attaches UE 110 to network elements 160. Wireless access node 150 and network elements 160 exchange user data to deliver the wireless data service to UE 110. Wireless access node 150 and wireless repeater 151 wirelessly exchange the user data to serve the wireless data service to UE 110. Wireless repeater 151 and UE 110 wirelessly exchange the user data to serve the wireless data service to UE 110.

Wireless access nodes 120, 130, 140, and 150 continue broadcast pilot signals. Wireless repeaters 121-123, 131-132, 141-143, and 151 continue to wirelessly receive and re-transmit the pilot signals. UE 110 reports the signal strengths to wireless access node 150 over wireless repeater 151. Wireless access node 150 identifies numbers of wireless repeaters between UE 110 and access node 120 (3), access node 130 (2), access node 140 (3), and access node 150 (1). Wireless access node 150 selects access node 130 as a secondary node based on its adequate signal strength and lowest remaining repeater amount (2). Wireless access node 150 signals the selection to wireless access node 130 and UE 110. UE 110 attaches to secondary wireless access node 130 over wireless repeaters 131-132. Wireless access node 130 attaches UE 110 to network elements 160. Wireless access node 130 and network elements 160 exchange user data to deliver the wireless data service to UE 110. Wireless access node 130 and wireless repeaters 131-132 wirelessly exchange the user data to serve the wireless data service to UE 110. Wireless repeater 131 and UE 110 wirelessly exchange the user data to serve the wireless data service to UE 110.

Figure 4:
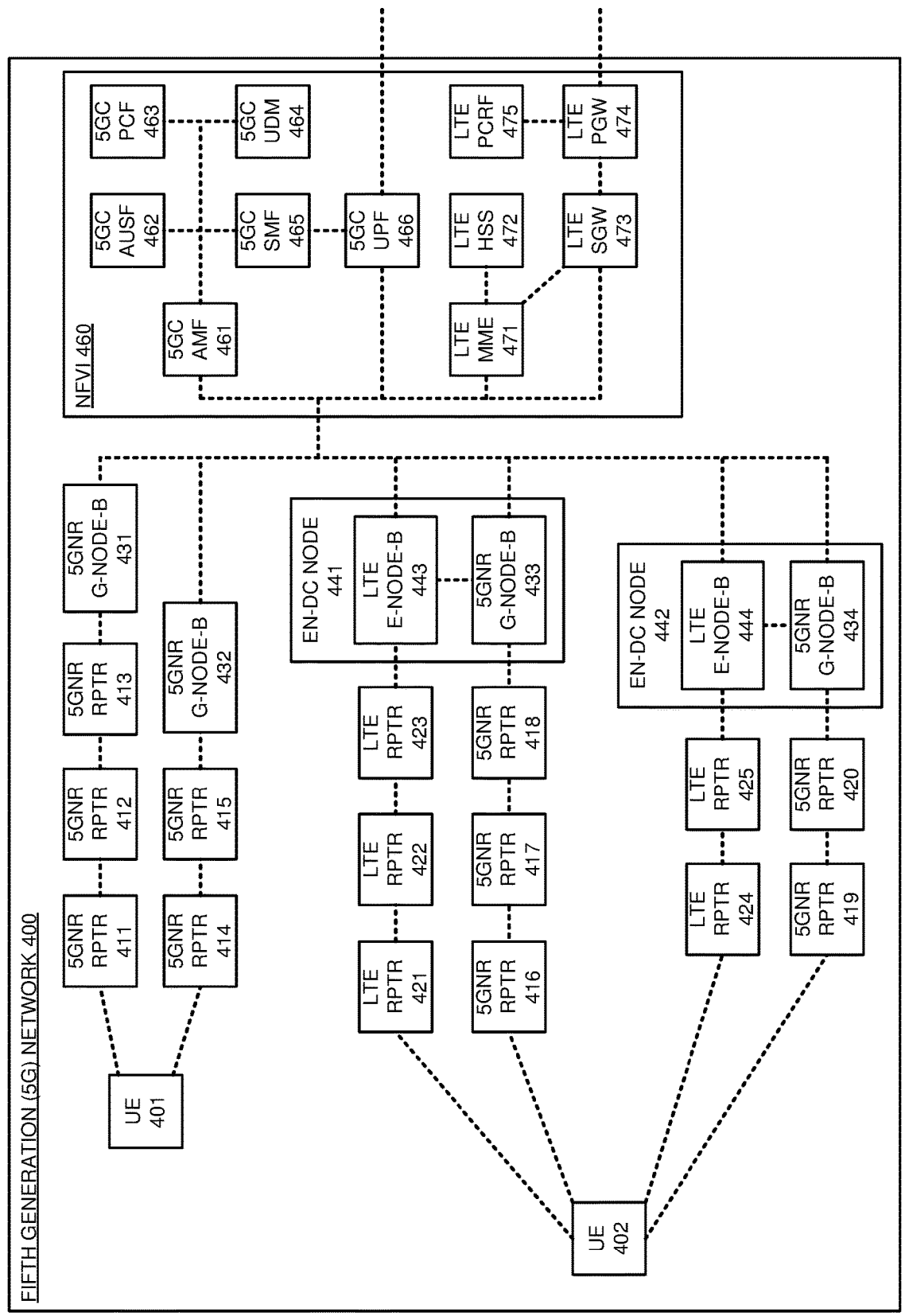
FIG. 4 illustrates a Fifth Generation (5G) network to serve UEs with a wireless data service over 5GNR repeaters and Long Term Evolution (LTE) repeaters.

FIG. 4 illustrates Fifth Generation (5G) network 100 to serve UEs 401-402 with a wireless data service over 5GNR repeaters 411-420 and Long Term Evolution (LTE) repeaters 421-425. 5G network 400 is an example of wireless communication network 100, although network 100 may differ. 5G network 400 comprises UEs 401-402, repeaters 411-425, 5G New Radio (5GNR) gNodeBs 431-432, Evolved Universal Terrestrial Radio Access Network Dual Connectivity (EN-DC) nodes 441-442, and Network Function Virtualization Infrastructure (NFVI) 460. EN-DC node 441 comprises 5GNR gNodeB 433 and LTE eNodeB 443, and EN-DC node 442 comprises 5GNR gNodeB 434 and LTE eNodeB 444. NFVI 460 comprises Access and Mobility Management Function (AMF) 461, Authentication and Security Function (AUSF) 462, Policy Control Function (PCF) 463, Unified Data Manager (UDM) 464, Session Management Function (SMF) 465, and User Plane Function (UPF) 466. NFVI 460 further comprises Mobility Management Entity (MME) 471, Home Subscriber System (HSS) 472, Serving Gateway (SGW) 473, Packet Data Network Gateway (PGW) 474, and Policy Charging Rules Function (PCRF) 475.

5GNR gNodeB 431 broadcasts a pilot signal, and 5GNR repeaters 411-413 wirelessly receive and re-transmit the pilot signal to UE 401. 5GNR gNodeB 432 broadcasts a pilot signal, and 5GNR repeaters 411-413 wirelessly receive and re-transmit the pilot signal to UE 401. UE 401 receives the pilot signals from repeaters 411 and 414 and attaches to the gNodeB with the best signal strength. In this example, UE 401 attaches to 5GNR gNodeB 431 over wireless repeaters 411-413 because repeater 411 has the best signal strength at UE 401.

5GNR gNodeB 431 requests data service for UE 401 from 5GC AMF 461 over N2 signaling. 5GC AMF 461 interacts with 5GC AUSF 462 and 5GC UDM 464 to authenticate and authorize 5GNR UE 401 for 5GNR data services. AMF 461 interacts with 5GC PCF 463, UDM 464, and SMF 465 to select wireless data services and their Quality-of-Service (QoS) levels and network addresses for UE 401. SMF 465 configures UPF 466 to serve UE 401 over 5GNR gNodeB 431 and repeaters 411-414 per the QoS levels and network addresses. AMF 461 transfers wireless data service IDs, QoS levels, and network addresses to 5GNR gNodeB 431. 5GNR gNodeB 431 transfers the wireless data service IDs, QoS levels, and network addresses to UE 401 over repeaters 411-414. 5GC UPF 466 exchanges user data between external systems and 5GNR gNodeB 431. 5GNR gNodeB 431 exchanges the user data with UE 401 over repeaters 411-414.

UE 401 determines and reports the signal strengths for 5GNR repeaters 411 and 414 to 5GNR gNodeB 431. In response to the report, 5GNR gNodeB 431 determines the number of 5GNR repeaters between UE 401 and the individual gNodeBs that have repeater signal strengths above an adequacy threshold. 5GNR repeaters 411-415 both have adequate signal strength at UE 401. 5GNR gNodeB 431 determines the number of repeaters between UE 401 and the gNodeBs with adequate signal strength at UE 401-gNodeB 431 has three repeaters and gNodeB 432 has two repeaters. 5GNR gNodeB 431 selects 5GNR gNodeB 432 to be the primary cell for UE 401 based on its adequate signal strength and its fewest repeaters. 5GNR gNodeB 431 signals 5GNR gNodeB 432 to serve UE 401. The transfer of UE 401 from gNodeB 431 to gNodeB 432 could be a handover or a detach/re-attach. 5GNR gNodeB 431 signals AMF 461 of the handover/reattachment. 5GNR gNodeB 431 signals UE 401 over repeaters 411-413 to handover/attach to 5GNR gNodeB 432. UE 401 handsovers/attaches to gNodeB 432 over repeaters 414-415.

For reattachment, 5GNR gNodeB 432 requests data service for UE 401 from 5GC AMF 461 over N2 signaling. 5GC AMF 461 interacts with 5GC AUSF 462 and 5GC UDM 464 to authenticate and authorize 5GNR UE 401 for 5GNR data services. AMF 461 interacts with 5GC PCF 463, UDM 464, and SMF 465 to select wireless data services and their QoS levels and network addresses for UE 401. SMF 465 configures UPF 466 to serve UE 401 over 5GNR gNodeB 432 per the QoS levels and network addresses. AMF 461 transfers the wireless data service IDs, QoS levels, and network addresses to 5GNR gNodeB 432. 5GNR gNodeB 432 transfers the wireless data service IDs, QoS levels, and network addresses to UE 401.

5GC UPF 466 exchanges user data between external systems and 5GNR gNodeB 432. 5GNR gNodeB 432 exchanges the user data with UE 401 over wireless repeaters 414-415. 5GNR gNodeB 432 then selects additional gNodeBs that have adequate signal strength and the fewest repeaters as secondary nodes to serve UE 401. For clarity, other gNodeBs and repeater chains are omitted. Primary gNodeB 432 may also select gNodeB 431 as a secondary node. 5GNR gNodeB 432 signals 5GNR gNodeB 431 to serve UE 401. 5GNR gNodeB 432 signals AMF 461 of the attachment, and AMF 461 directs SMF 465 to drive UPF 466 to serve UE 401 over gNodeB 431. 5GNR gNodeB 432 signals UE 401 over repeaters 414-415 to attach to 5GNR gNodeB 431. UE 401 attaches to gNodeB 431 over repeaters 411-413. 5GC UPF 466 now exchanges user data between external systems and 5GNR gNodeBs 431-432. Primary gNodeB 432 exchanges the user data with UE 401 over wireless repeaters 414-415, and secondary gNodeB 531 exchanges the user data with UE 401 over wireless repeaters 411-413.

LTE eNodeB 443 broadcasts a pilot signal from EN-DC node 441, and LTE repeaters 421-423 wirelessly receive and re-transmit the pilot signal to UE 402. LTE eNodeB 444 broadcasts a pilot signal from EN-DC node 442, and LTE repeaters 424-425 wirelessly receive and re-transmit the pilot signal to UE 402. UE 402 receives the pilot signals from repeaters 421 and 424 and attaches to the eNodeB with the best signal strength. In this example, UE 402 attaches to LTE eNodeB 443 over wireless repeaters 421-423 because repeater 421 has the best signal strength at UE 402.

UE 402 attaches to LTE eNodeB 443 in EN-DC node 441 over LTE repeaters 421-423. UE 402 indicates its 5GNR capability during attachment. LTE eNodeB 443 requests data service for UE 402 from LTE MME 471 over S1-MME signaling and indicates the 5GNR capability. MME 471 interacts with HSS 472 to authenticate and authorize UE 402 for wireless data services that are represented by Access Point Names (APNs) and include 5GNR service. MME 471 transfers the APNs for UE 402 to LTE PGW 474 over LTE SGW 473. LTE PGW 474 interacts with LTE PCRF 475 to select QoS Class Identifiers (QCIs) and network addresses for UE 402 based on the APNs.

LTE PGW 474 transfers the APNs, QCIs, and network addresses for UE 402 to MME 471 over LTE SGW 473. MME 471 transfers the APNs, QCIs, and network address for UE 401 to LTE eNodeB 443. LTE eNode B 443 transfers the selected APNs, QCIs, and network addresses to UE 402 over LTE repeaters 421-423. LTE PGW 474 exchanges user data for UE 402 with external systems. LTE PGW 474 exchanges the user data with SGW 473 which exchanges the user data with LTE eNodeB 443. LTE eNodeB 443 exchanges the user data with UE 402 over LTE repeaters 421-423.

In response to 5GNR service authorization and the signal strength of repeater 416 at UE 402, LTE eNodeB 443 directs UE 402 to attach to 5GNR gNodeB 433 in EN-DC node 441. UE 402 responsively attaches to 5GNR gNodeB 433 over 5GNR repeaters 416-418. LTE eNodeB 443 notifies MME 471 of the UE attachment to gNodeB 433. LTE MME 471 directs LTE SGW 473 to serve UE 401 over 5GNR gNodeB 433. In response, LTE SGW 473 exchanges user data for UE 410 with 5GNR gNodeB 433 in addition to LTE eNodeB 443. 5GNR gNodeB 433 exchanges the user data with UE 402 over repeaters 416-418.

UE 402 continues to receive the pilot signals from LTE eNodeBs 443-444 over LTE repeaters 421-425 and reports their signal strength to LTE eNodeB 443 over repeaters 421-423. In this example, LTE repeaters 421 and 424 have adequate signal strength at UE 402 for respective eNodeBs 443-444. LTE eNodeB 443 determines the number of repeaters between UE 402 and the eNodeBs having the adequate signal strength: eNodeB 433 (3) and eNodeB 444 (2). In this example, eNodeB 443 selects eNodeB 444, because eNodeB 444 has an adequate signal and fewer repeaters (2) than eNodeB 443 (3). LTE eNodeB 443 signals LTE eNodeB 444 to serve UE 402, and LTE eNodeB 443 signals UE 402 to handover or to detach/reattach to eNodeB 444. UE 402 hands-over/attaches to LTE eNodeB 444 in EN-DC node 442 over LTE repeaters 424-425.

For a reattachment, UE 402 indicates its 5GNR capability during attachment. LTE eNodeB 444 requests data service for UE 402 from LTE MME 471 over S1-MME signaling and indicates the 5GNR capability. MME 471 interacts with HSS 472 to authenticate and authorize UE 402 for wireless data services that are represented by APNs and include 5GNR service. MME 471 transfers the APNs for UE 402 to LTE PGW 474 over LTE SGW 473. LTE PGW 474 interacts with LTE PCRF 475 to select QCIs and network addresses for UE 402 based on the APNs. LTE PGW 474 transfers the APNs, QCIs, and network addresses for UE 402 to MME 471 over LTE SGW 473. MME 471 transfers the APNs, QCIs, and network address for UE 401 to LTE eNodeB 444. LTE eNode B 444 transfers the selected APNs, QCIs, and network addresses to UE 402 over LTE repeaters 424-425.

LTE PGW 474 exchanges user data for UE 402 with external systems. LTE PGW 474 exchanges the user data with SGW 473 which now exchanges the user data with LTE eNodeB 444. LTE eNodeB 444 exchanges the user data with UE 402 over repeaters 424-425. In response to 5GNR service authorization and received signal strength, LTE eNodeB 444 directs UE 402 to attach to 5GNR gNodeB 434 in EN-DC node 442. UE 402 responsively attaches to 5GNR gNodeB 434 over 5GNR repeaters 419-420. LTE eNodeB 443 signals MME 471 of the attachment. LTE MME 471 directs LTE SGW 473 to serve UE 402 over 5GNR gNodeB 434. In response, LTE SGW 473 exchanges user data for UE 402 with 5GNR gNodeB 434 in addition to LTE eNodeB 444. 5GNR gNodeB 434 exchanges the user data with UE 402 over 5GNR repeaters 419-420.

LTE eNodeB 444 then selects additional NodeBs that have adequate signal strength and the fewest repeaters as secondary nodes to serve UE 402. For clarity, additional NodeBs and repeater chains are omitted. In this example, primary eNodeB 444 may select EN-DC node 441 as a secondary node. LTE eNodeB 444 signals LTE eNodeB 443 to serve UE 402, and signals UE to attach to LTE eNodeB 443. LTE eNodeB 443 signals MME 471 of the UE attachment, and AMF 461 directs SGW 473 to serve UE 402 over eNodeB 443 and gNodeB 433. LTE eNodeB 443 signals UE 402 over repeaters 421-423 to attach to 5GNR gNodeB 433. UE 402 attaches to gNodeB 433 over repeaters 416-418. SGW 472 now exchanges user data between the external systems and LTE eNodeBs 443-444 and 5GNR gNodeBs 433-434. Primary eNodeB 444 exchanges the user data with UE 402 over wireless repeaters 424-425 and secondary NodeBs 433-434 and 443 exchange the user data with UE 402 over wireless repeaters 416-423.

For clarity, other UEs are not shown on FIG. 4. In some examples, wireless access node 110 determines amounts of these other UEs that are directly served by individual gNodeBs 431-434 and eNodeBs 443-444 (not served through a repeater). The serving NodeB determines amounts of UEs that are indirectly served by individual gNodeBs 431-434 and eNodeBs 443-444 (served through a repeater). The serving NodeB selects the primary access node based on the signal strengths, repeater amounts, and UE amounts. The UE amounts may be the amount of directly served UEs, indirectly served UEs, or the sum of both amounts.

In some examples, the serving NodeB may determine performance metrics for the other UEs that are directly served by the individual serving and target NodeBs. The serving NodeB may determine performance metrics for the UEs that are indirectly served by individual serving and target NodeBs over the wireless repeaters. The serving access node may select the primary access node based on the signal strengths, repeater amounts, UE amounts, and performance metrics.

In some examples, the serving NodeB determines velocity for wireless UEs 401-402. The serving access node also determines individual repeater antenna characteristics for the individual serving and target NodeBs. Exemplary antenna characteristics include numbers of antenna elements, antenna rank, and the like. When the UE velocity exceeds a threshold, the serving NodeB selects the primary access node based on the signal strengths, repeater amounts, and individual antenna characteristics.

Figure 5:
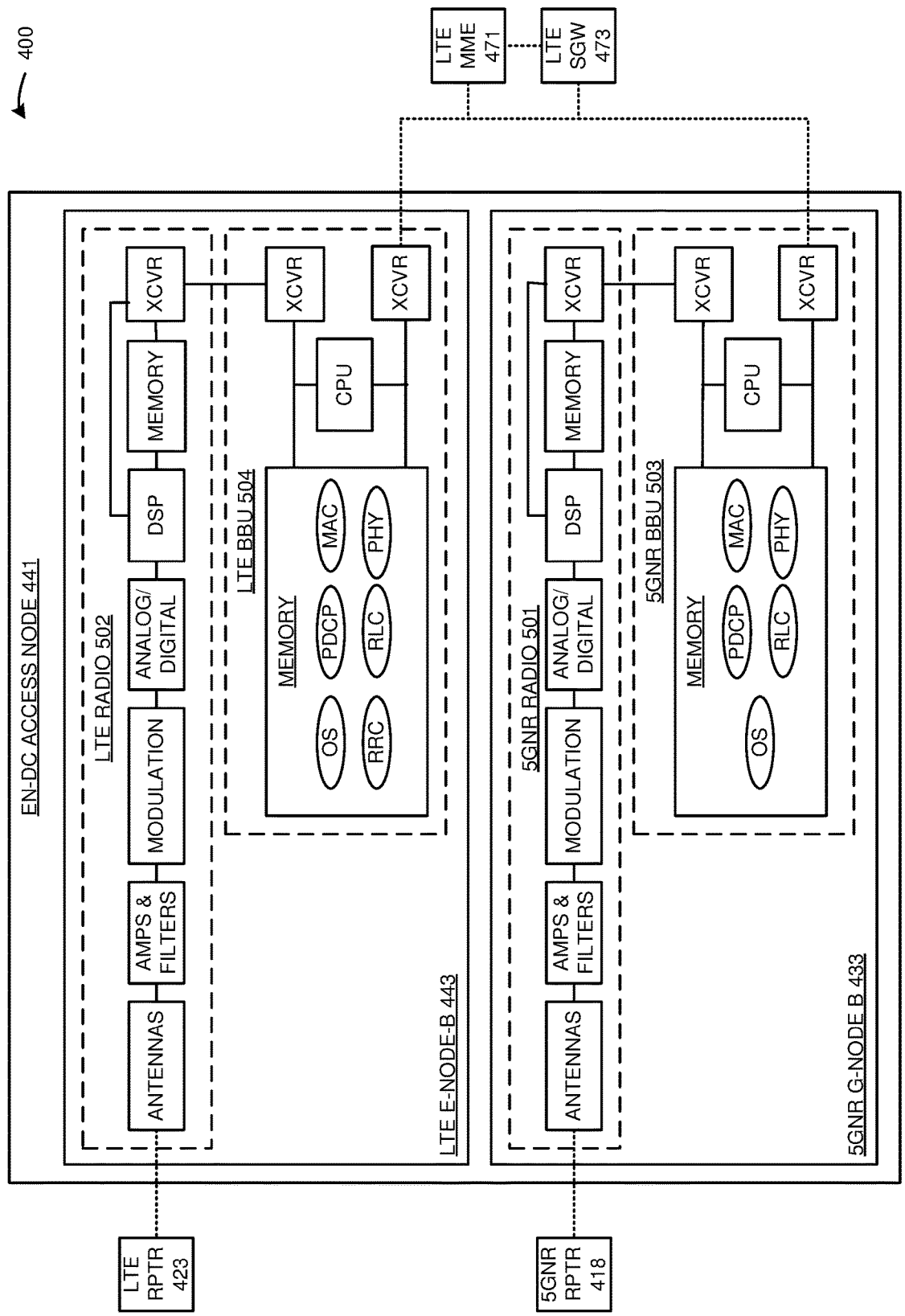
FIG. 5 illustrates an Evolved Universal Terrestrial Radio Access Network Dual Connectivity (EN-DC) node to serve the UEs with the wireless data service over 5GNR repeaters and the LTE repeaters.

FIG. 5 illustrates Evolved Universal Terrestrial Radio Access Network Dual Connectivity (EN-DC) access node 441 to serve UEs 401-402 with the wireless data service over 5GNR repeater 418 and LTE repeater 423. EN-DC access node 441 is an example of wireless access nodes 120, 130, 140, 150, and 442, although access nodes 120, 130, 140, 150, and 442 may differ. EN-DC access node 441 comprises 5GNR gNodeB 433 and LTE eNodeB 443. 5GNR gNodeB 433 comprises 5GNR radio 501 and 5GNR Baseband Unit (BBU) 503. LTE eNodeB 443 comprises LTE radio 502 and LTE BBU 504.

Radios 501-502 comprise antennas, amplifiers, filters, modulation, analog-to-digital interfaces, DSP, memory, and transceivers (XCVR) that are coupled over bus circuitry. BBUs 503-504 comprise memory, CPU, and transceivers that are coupled over bus circuitry. The memories in BBUs 503-504 store operating systems (OS) and network applications like Physical Layer (PHY), Media Access Control (MAC), Radio Link Control (RLC), Packet Data Convergence Protocol (PDCP), and Radio Resource Control (RRC). The CPU in BBUs 503-504 execute the operating systems, PHYs, MACs, RLCs, PDCPs, and RRCs to exchange network signaling with UE 410 and MME 471 and to exchange user data between UE 410 and SGW 473. BBUs 503-504 may be distributed among multiple interconnected units.

5GNR repeater 418 is wirelessly coupled to the antennas in 5GNR radio 501 over a 5GNR link. A transceiver in 5GNR radio 501 is coupled to a transceiver in 5GNR BBU 503 over Common Public Radio Interface (CPRI) links. A transceiver in 5GNR BBU 503 is coupled to MME 431 and SGW 432 over backhaul links. LTE repeater 423 is wirelessly coupled to the antennas in LTE radio 502 over an LTE link. A transceiver in LTE radio 502 is coupled to a transceiver in LTE BBU 504 over CPRI links. A transceiver in LTE BBU 504 is coupled to MME 471 and to SGW 473 over backhaul links. A transceiver in 5GNR BBU 503 is coupled to a transceiver in LTE BBU 504 over X2 links.

In LTE radio 502, the antennas receive wireless LTE signals from LTE repeater 423 that transports Uplink (UL) LTE signaling and UL LTE data from UE 402. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling to MME 471 over the backhaul links. The PDCP transfers the UL LTE data to LTE SGW 473 over the backhaul links.

In LTE BBU 504, the LTE RRC receives the DL S1-MME signaling from MME 471, and the PDCP receives DL LTE data from SGW 473. The LTE network applications process the new DL LTE signaling and the DL LTE data to generate corresponding DL LTE symbols that carry the DL LTE signaling and DL LTE data. In LTE radio 502, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals to LTE repeater 423 that transport the DL LTE signaling and DL LTE data to UE 402.

In 5GNR radio 501, the antennas receive wireless 5GNR signals from 5GNR repeater 418 that transport UL 5GNR signaling and UL 5GNR data from UE 402. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC in LTE BBU 504 to generate new UL X2 signaling and new DL 5GNR signaling. The 5GNR PDCP transfers the new UL X2 signaling to the LTE RRC in BBU 504. The 5GNR PDCP transfers the UL 5GNR data to SGW 473 over backhaul links.

In 5GNR BBU 503, the 5GNR PDCP receives the DL X2 signaling from the LTE RRC in BBU 504. The 5GNR PDCP also receives DL 5GNR data from SGW 473. The 5GNR network applications process the new DL 5GNR signaling and the DL 5GNR data to generate corresponding DL 5GNR symbols that carry the DL 5GNR signaling and DL 5GNR data. In 5GNR radio 501, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals to 5GNR repeater 418 that transport the DL 5GNR signaling and DL 5GNR data to UE 402.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The RRC in LTE BBU 504 broadcasts a pilot signal over radio 502, and LTE repeater 423 wirelessly receives and re-transmits the pilot signal. 5GNR gNodeB 432 broadcasts a pilot signal over radio 501, and 5GNR repeater 418 wirelessly receives and re-transmits the pilot signal. The RRC in LTE BBU 504 exchanges LTE attachment signaling for UE 402 with LTE repeater 423. The LTE signaling from UE 402 indicates the 5GNR capability of UE 402. The RRC in LTE BBU 403 requests data service for UE 402 from MME 471 over S1-MME signaling that indicates the 5GNR capability of UE 402. The RRC in LTE BBU 504 receives the APNs, QCIs, and network addresses for UE 402. LTE eNode B 443 transfers the selected APNs, QCIs, and network addresses for UE 402 to LTE repeater 423. SGW 473 exchanges user data with the PDCP in LTE BBU 504. The PDCP exchanges the user data for UE 402 with LTE repeater 423.

In response to the 5GNR service authorization and the signal strength of 5GNR repeater 418 at UE 402, the RRC in LTE BBU 503 directs UE 402 to attach to 5GNR gNodeB 433 in EN-DC node 441. The PDCP in 5GNR BBU 503 exchanges attachment signaling for UE 402 with 5GNR repeater 418 and transfers corresponding X2 signaling to the RRC in LTE BBU 504. The RRC in LTE BBU 504 notifies MME 471 of the UE attachment to gNodeB 433. LTE MME 471 directs LTE SGW 473 to serve UE 401 over 5GNR gNodeB 433. LTE SGW 473 exchanges user data for UE 402 with the PDCP in 5GNR BBU 503. The PDCP in 5GNR BBU 503 exchanges the user data for UE 402 with 5GNR repeater 418 over radio 501.

The RRC in LTE BBU 504 receives signal strength reports for UE 402 from repeater 423. When access nodes are not available, the LTE RRC in BBU 504 identifies repeaters that have adequate signal strength at UE 402 and determines the number of repeaters for UE 402 over each of these repeaters. The LTE RRC in BBU 504 attempts to use the fewest repeaters. The LTE RRC in BBU 504 signals the 5GNR gNodeBs that serve the selected repeater to serve UE 402. The LTE RRC in BBU 504 signals UE 402 to attach to these 5GNR gNodeBs.

Figure 6:
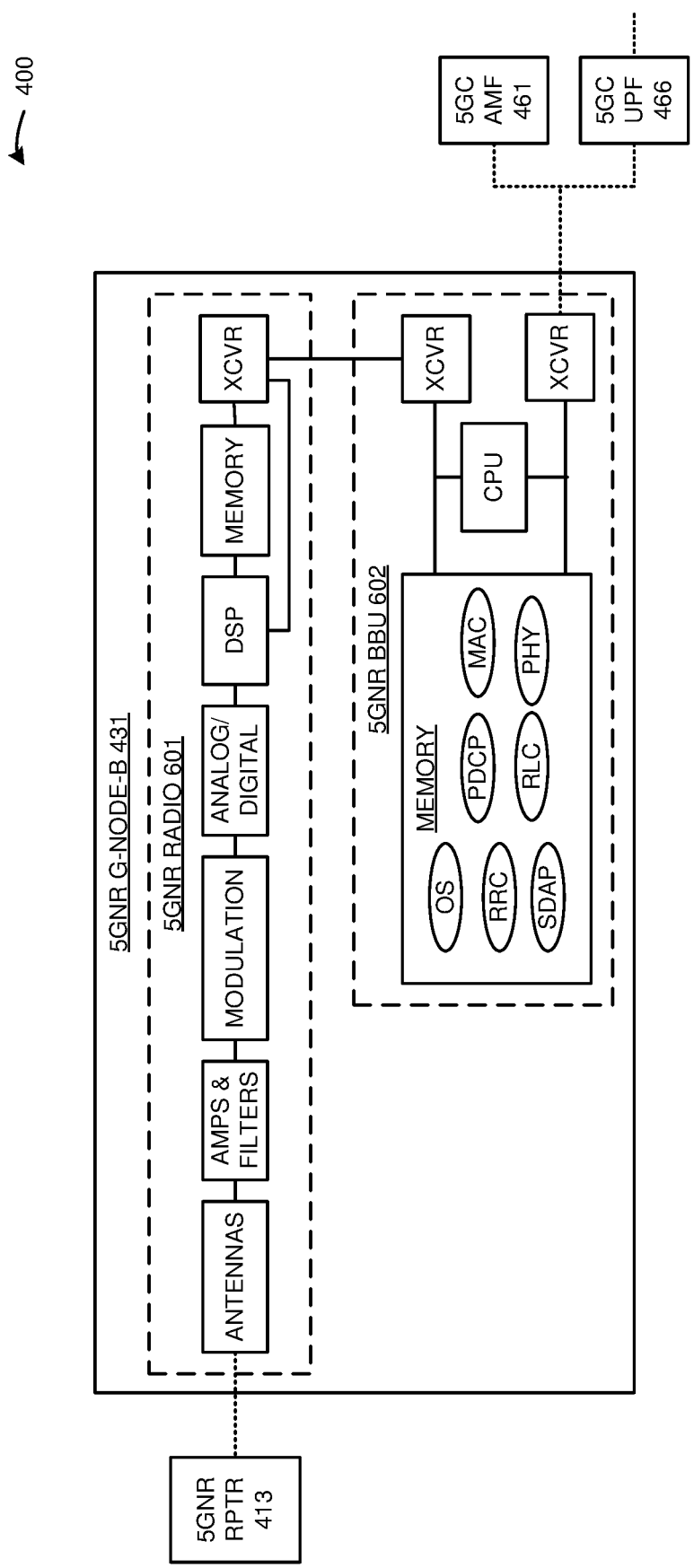
FIG. 6 illustrates a 5G New Radio (5GNR) gNodeB to serve the UEs with the wireless data service over the 5GNR repeaters.

FIG. 6 illustrates 5G New Radio (5GNR) gNodeB 431 to serve UE 401 with the wireless data service over the 5GNR repeaters 411-413. 5GNR gNodeB 431 is an example of wireless access node 120, although access node 120 may differ. 5GNR gNodeB 431 comprises 5GNR radio 601 and 5GNR BBU 602. 5GNR radio 601 comprises antennas, amplifiers, filters, modulation, analog-to-digital interfaces, DSP, memory, and transceivers that are coupled over bus circuitry. BBU 602 comprises memory, CPU, and transceivers that are coupled over bus circuitry. The memory in BBU 602 stores operating systems and network applications like PHY, MAC, RLC, PDCP, RRC, and Service Data Adaptation Protocol (SDAP). The CPU in BBU 602 executes the operating systems, PHYs, MACs, RLCs, PDCPs, SDAPs, and RRCs to exchange network signaling and user data for UE 401 with 5GNR repeater 413, to exchange network signaling for UE 401 with AMF 461, and to exchange user data for UE 401 with UPF 466.

5GNR repeater is wirelessly coupled to the antennas in 5GNR radio 601 over a 5GNR link. A transceiver in 5GNR radio 601 is coupled to a transceiver in 5GNR BBU 602 over CPRI links. A transceiver in 5GNR BBU 602 is coupled to AMF 461 and UPF 466 over backhaul links. In 5GNR radio 601, the antennas receive wireless 5GNR signals from 5GNR repeater 413 that transport UL 5GNR signaling and UL 5GNR data from UE 401. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5GNR RRC processes the UL 5GNR signaling and DL N2 signaling from AMF 461 to generate new UL N2 signaling and new DL 5GNR signaling. The 5GNR RRC transfers the new UL N2 signaling to AMF 461. The 5GNR SDAP transfers the UL 5GNR data to UPF 466 over backhaul links.

In 5GNR BBU 602, the 5GNR RRC receives the DL N2 signaling from AMF 461. The 5GNR SDAP receives DL 5GNR data from UPF 466. The 5GNR network applications process the new DL 5GNR signaling and the DL 5GNR data to generate corresponding DL 5GNR symbols that carry the DL 5GNR signaling and DL 5GNR data. In 5GNR radio 601, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals to repeater 413 that transport the DL 5GNR signaling and DL 5GNR data for 5GNR UE 401.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, pre-coding, DFTs/IDFTs, and RE mapping/de-mapping.

The RRC in 5GNR BBU 602 broadcasts a pilot signal over 5GNR radio 601. 5GNR repeater 413 wirelessly receives and re-transmits the pilot signal. The RRC in 5GNR gNodeB 431 exchanges attachment signaling for UE 401 with repeater 413 over radio 601. The RRC in 5GNR BBU 602 requests data service for UE 401 from 5GC AMF 461 over N2 signaling. AMF 461 indicates wireless data services, QoS levels, and network addresses to the RRC in 5GNR BBU 602. The RRC in 5GNR BBU 602 transfers signaling for UE 401 that indicates the wireless data services, QoS levels, and network addresses to repeaters 413 over 5GNR radio 601. 5GC UPF 466 exchanges user data between external systems and the SDAP in 5GNR BBU 602. The SDAP in 5GNR BBU 602 exchanges the user data for UE 411 with 5GNR repeater 413 over radio 601.

The RRC in 5GNR BBU 602 receives signal strength reports for UE 401 from 5GNR repeater 413 over radio 601. In response to the reports, 5GNR gNodeB 431 determines the number of 5GNR repeaters between UE 401 and the individual gNodeBs that have adequate signal strength. The RRC in 5GNR BBU 602 selects a 5GNR gNodeB to be the primary cell for UE 401 based on adequate signal strength and fewest repeaters. The RRC in BBU 602 signals the 5GNR gNodeB to serve UE 401. The signaling could trigger a handover or reattach. The RRC in BBU 602 signals AMF 461 of the handover/reattachment. The RRC in BBU 602 signals UE 401 over repeaters 411-413 to handover/attach to the 5GNR gNodeB.

Figure 7:
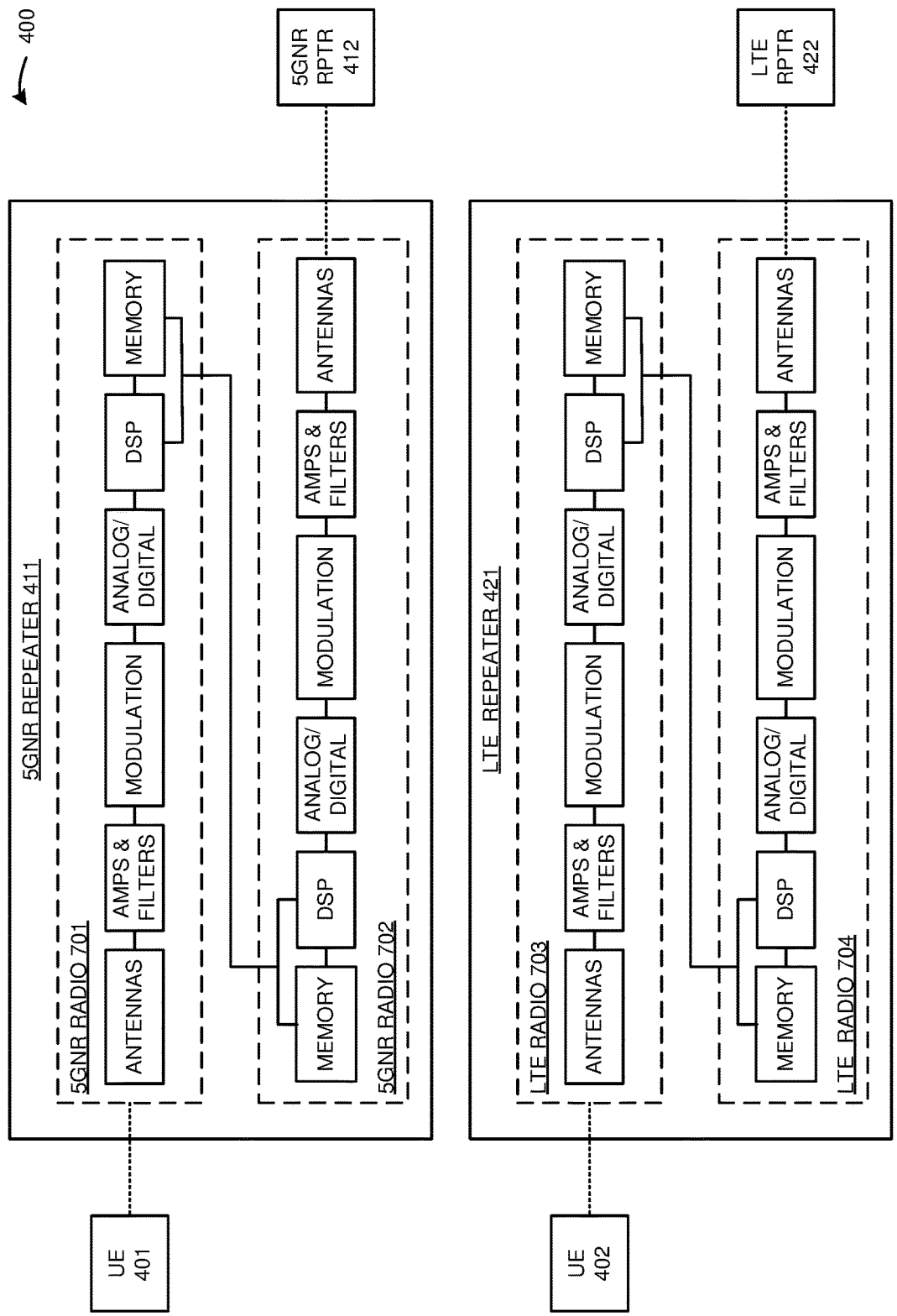
FIG. 7 illustrates a 5GNR repeater and an LTE repeater to serve the UEs with the wireless data service.

FIG. 7 illustrates 5GNR repeater 411 and LTE repeater 421 to serve UEs 401-402 with the wireless data service. Repeaters 411 and 421 comprise examples of repeaters 121-123, 131-132, 141-143, and 151, although these repeaters may differ. 5GNR repeater 411 comprises 5GNR radios 701-702. LTE repeater 421 comprises LTE radios 703-704. Radios 701-704 comprise antennas, amplifiers, filters, modulation (including demodulation), analog-to-digital interfaces, DSP, and memory that are coupled over bus circuitry. The memories store operating systems and radio applications. In some examples, demodulation/remodulation, analog-to-digital and digital-to-analog conversion, and/or the DSP/memory are omitted from radios 701-704. In other examples, a baseband unit is added between 5GNR radios 701-702 and/or radios 703-704. The BBU executes RRC, SDAP, PDCP, RLC, MAC, PHY, and other network applications to operate the BBU as gNodeB/UE combination that is wireless-in/wireless-out.

The DSP in 5GNR radios 701-702 execute operating systems and radio applications to exchange wireless signals between UE 401 and 5GNR repeater 412. The DSP in LTE radios 703-704 execute operating systems and radio applications to exchange wireless signals between UE 402 and LTE repeater 422. UE 401 is wirelessly coupled to the antennas in 5GNR radio 701 over a 5GNR link. UE 402 is wirelessly coupled to the antennas in LTE radio 703 over an LTE link. The DSP and memory in 5GNR radio 701 is coupled to the DSP and memory in 5GNR radio 702. The DSP and memory in LTE radio 703 is coupled to the DSP and memory in LTE radio 704.

In radios 701-704, the antennas receive wireless signals that transport network signaling and user data. The antennas transfer corresponding electrical signals through duplexers to the amplifiers. The amplifiers boost the received signals for filters which attenuate unwanted energy. Demodulators down-convert the wireless signals from their carrier frequency. The analog/digital interfaces convert the analog UL signals into digital signals for the DSP. The DSP executes the radio applications to clean-up and transfer the digital signals to radios 701-704 for wireless transmission.

In radios 701-704, the memory receives these digital signals for wireless transmission. The DSP executes the radio applications to format the digital signals for the analog-to-digital interfaces. The analog-to-digital interfaces convert the digital signals into analog signals for modulation. Modulation up-converts the analog signals to their carrier frequencies. The amplifiers boost the modulated signals for the filters which attenuate unwanted out-of-band energy. The filters transfer the filtered signals through duplexers to the antennas. The filtered signals drive the antennas to emit corresponding wireless signals that transport the network signaling and the user data.

Figure 8:
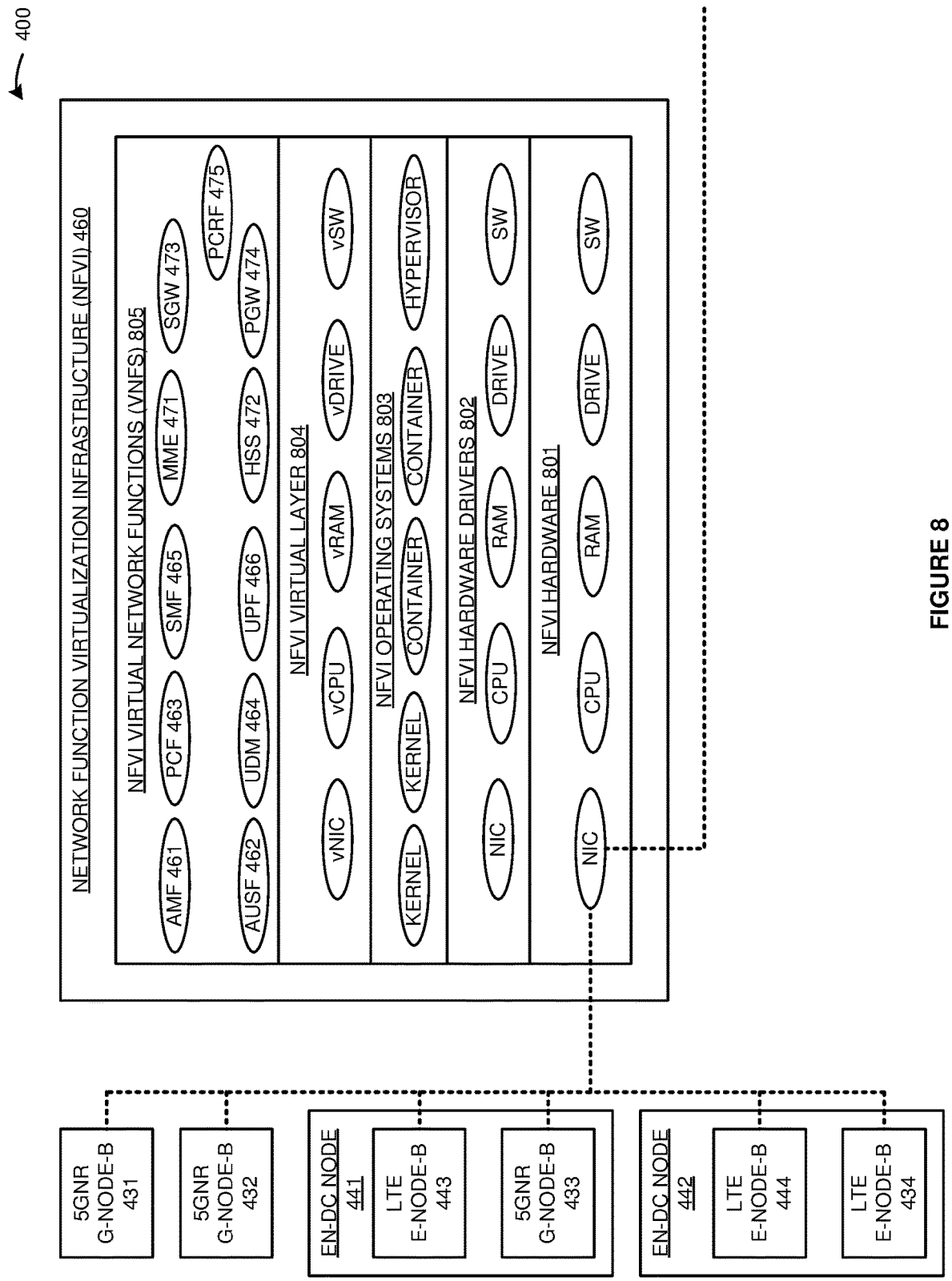
FIG. 8 illustrates a Network Function Virtualization Infrastructure (NFVI) to serve the UEs with the wireless data service over the 5GNR repeaters and LTE repeaters.

FIG. 8 illustrates Network Function Virtualization Infrastructure (NFVI) 460 to serve UEs 401-402 with the wireless data service over 5GNR repeaters 411-420 and LTE repeaters 421-425. NFVI 460 is an example of network elements 160, although network elements 160 may differ. NFVI 460 comprises NFVI hardware 801, NFVI hardware drivers 802, NFVI operating systems 803, NFVI virtual layer 804, and NFVI Virtual Network Functions (VNFs) 805. NFVI hardware 801 comprises Network Interface Cards (NIC), CPU, RAM, flash/disk drives, and data switches (SW). NFVI hardware drivers comprises software that is resident in the NIC, CPU, RAM, DRIVE, and SW. NFVI operating systems 803 comprises kernels containers, hypervisors, and the like. NFVI virtual layer 804 comprises virtual NICs (vNIC), virtual CPUs (vCPU), virtual RAM (vRAM), virtual Drives (vDRIVE), and virtual Switches (vSW). The NIC are coupled to NodeBs 431-434 and 443-444 over backhaul links. The NIC are coupled to external systems over SGi and N6 links. NFVI VNFs 805 comprise AMF 461, AUSF 462, PCF 463, UDM 464, SMF 465, UPF 466, MME 471, HSS 472, SGW 473, PGW 474, and PCRF 475. Other LTE and 5GC VNFs are typically present but are omitted for clarity. NFVI hardware 801 executes NFVI hardware drivers 802, NFVI operating systems 803, NFVI virtual layer 804, and NFVI VNFs 805 to serve UEs 401-402 with the data services over NodeBs and repeaters.

SGW 473 exchanges user data with NodeBs 433-434 and 443-444 over the backhaul links. MME 471 receives S1-MME signaling from one of LTE eNodeBs 443-444 that request data services for UE 402. MME 471 interacts with HSS 472 to authenticate and authorize UE 402 for wireless data services that are represented by APNs—and that include 5GNR service for UE 402. MME 471 transfers the APNs for UE 402 to PGW 474 over SGW 473. PGW 474 interacts with PCRF 475 to select QCIs and network addresses for UE 402 based on the APNs. PGW 474 transfers the APNs, QCIs, and addresses to MME 471 over SGW 473. MME 471 transfers the APNs, QCIs, and network addresses for UE 401 to one of LTE eNodeBs 443-444. PGW 474 exchanges user data for UE 402 with external systems. LTE PGW 474 exchanges the user data with SGW 473 which exchanges the user data with one of LTE eNodeBs 443-444. MME 471 receives a 5GNR attachment indication from one of 5GNR gNodeBs 433-434 and directs SGW 473 to serve UE 401 over the one of 5GNR gNodeBs 433-434. SGW 473 exchanges user data with the one of 5GNR gNodeBs 433-434. In some examples, SGW 473 and PGW 474 are integrated together into a System Architecture Evolution Gateway (SAE GW) in NFVI 460.

UPF 466 exchanges user data with 5GNR gNodeBs 431-432 over backhaul links. AMF 461 receives N2 signaling from one of 5GNR gNodeBs 431-432 that requests data service for UE 401. AMF 461 interacts with SMF 465, AUSF 462, PCF 463, and UDM 462 to authenticate and authorize 5GNR UE 401 for 5GNR data services. AMF 461 transfers quality-of-service metrics and network addressing for 5GNR UE 401 to the one of 5GNR gNodeBs 431-432. SMF 465 directs UPF 466 to serve UE 401 per the quality-of-service metrics and network addressing.

Figure 9:
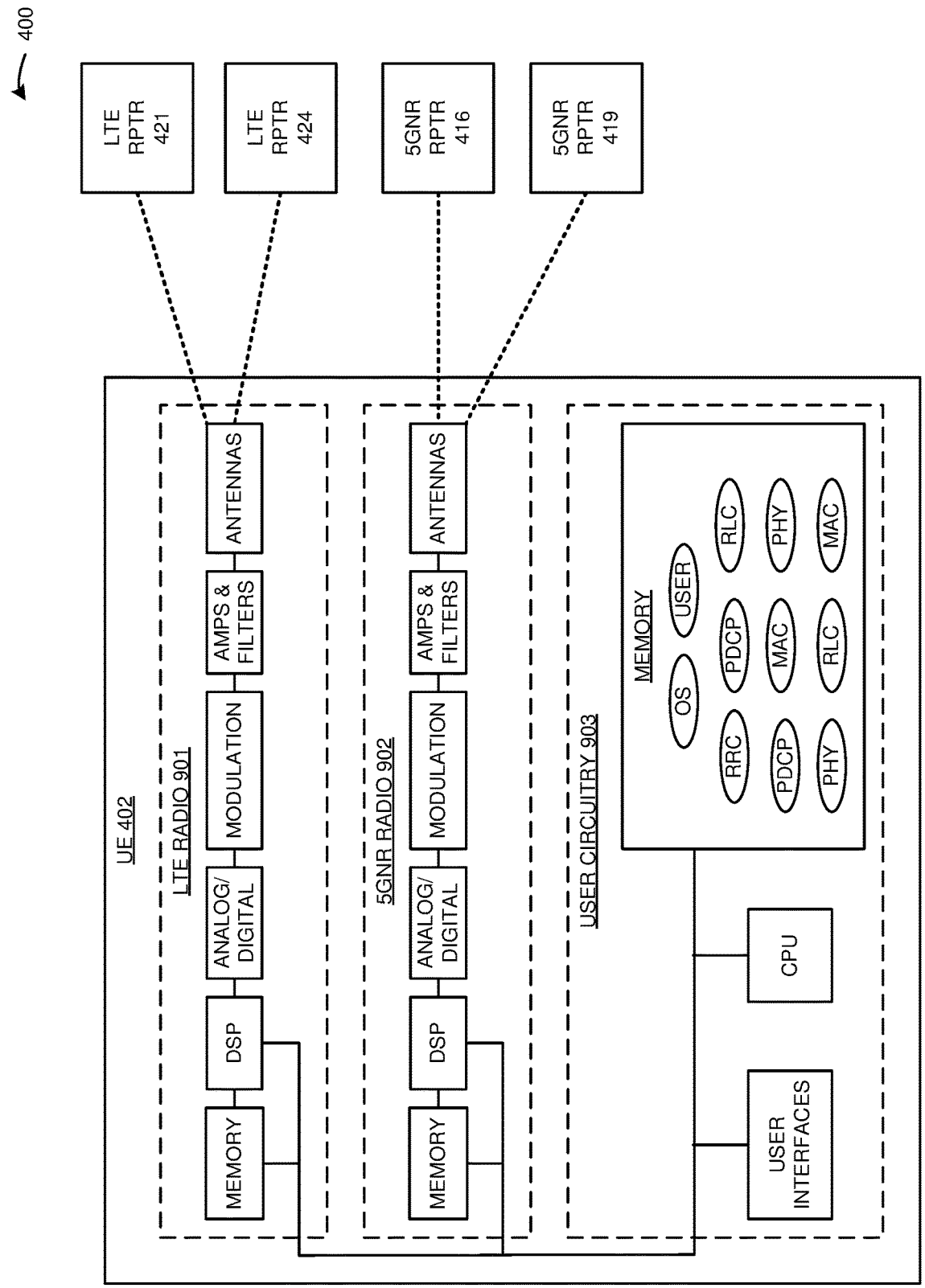
FIG. 9 illustrates a UE to receive the wireless data service over the 5GNR repeaters and the LTE repeaters.

FIG. 9 illustrates UE 402 to receive the wireless data service over 5GNR repeaters 416 and 419 and LTE repeaters 421 and 424. UE 402 is an example of UE 110, although UE 110 may differ. UE 402 comprises LTE radio 901, 5GNR radio 902, and user circuitry 903 that are coupled over bus circuitry. Radios 901-902 comprise antennas, amplifiers, filters, modulation, analog-to-digital interfaces, DSP, and memory that are coupled over bus circuitry. User circuitry 903 comprises user interfaces, CPU, and memory that are coupled over bus circuitry. The antennas in radios 901-902 are wirelessly coupled to repeaters 416, 419, 421, and 424. The user interfaces in user circuitry 903 comprise graphic displays, machine controllers, sensors, cameras, transceivers, and/or some other user components. The memory in user circuitry 903 stores an operating system, user applications (USER), and network applications (PHY, MAC, RLC, PDCP, and RRC). The CPU in user circuitry 903 executes the operating system and the user applications to generate and consume user data. The CPU in user circuitry 903 executes the operating system and the network applications to wirelessly exchange corresponding signaling and data with repeaters 416, 419, 421, and 424 over radios 901-902.

The LTE RRC in user circuitry 903 receives pilot signals from LTE repeaters 421 and 424 over LTE radio 901. The LTE RRC and attaches to one of eNodeBs 443 or 444 based on the best pilot signal strength. The 5GNR PDCP in user circuitry 903 receives pilot signals from 5GNR repeaters 416 and 419 over 5GNR radio 902. The 5GNR PDCP in reports the 5GNR signal strength to the LTE RRC which reports the LTE and 5GNR signal strengths to MME 471 over radio 901 and repeater 421 or 424. In this example, UE 402 attaches to LTE eNodeB 443 in EN-DC node 441 over wireless repeaters 421-423 because repeater 421 has the best signal strength at UE 402. The LTE RRC indicates 5GNR capabilities to MME 471 during attachment. The LTE RRC receives APNs, QCIs, and network addresses over LTE repeaters 421-423. The LTE PDCP exchanges user data with SGW 473 over LTE repeaters 421-423 and eNodeB 443 in EN-DC node 441.

In response to 5GNR service authorization and the signal strength of 5GNR repeater 416 at UE 402, LTE eNodeB 443 directs the LTE RRC in UE 402 to attach to 5GNR gNodeB 433 in EN-DC node 441. The 5GNR PDCP wirelessly attaches to 5GNR gNodeB 433 over 5GNR repeaters 416-418. The LTE RRC notifies MME 471 of the 5GNR attachment. The 5GNR PDCP exchanges user data with SGW 473 over 5GNR radio 902, 5GNR repeaters 416-418, and 5GNR gNodeB 433. The LTE RRC may receive instructions to handover or re-attach to other eNodeBs in other EN-DC nodes—typically over a fewer number of repeaters. The LTE RRC responsively hands-over or re-attaches to the other eNodeB—possibly over repeaters.

UE 401 would be similar to UE 402. For UE 401, the LTE RRC, LTE PDCP, LTE RLC, LTE MAC, LTE PHY, and LTE radio 901 are omitted. A 5GNR RRC and SDAP are added. The 5GNR RRC attaches to gNodeBs (possibly over 5GNR repeaters) based on signal strength and reports the signal strengths to the serving 5GNR gNodeBs. The 5GNR PDCP in UE 401 exchanges user data with UPF 466 over 5GNR radio 902, 5GNR gNodeBs, and possibly 5GNR repeaters.

The 5GNR RRC may receive instructions to handover or re-attach to other gNodeBs—typically over a fewer number of 5GNR repeaters. The 5GNR RRC responsively hands-over or re-attaches to the other gNodeB—possibly over repeaters.

Figure 10:
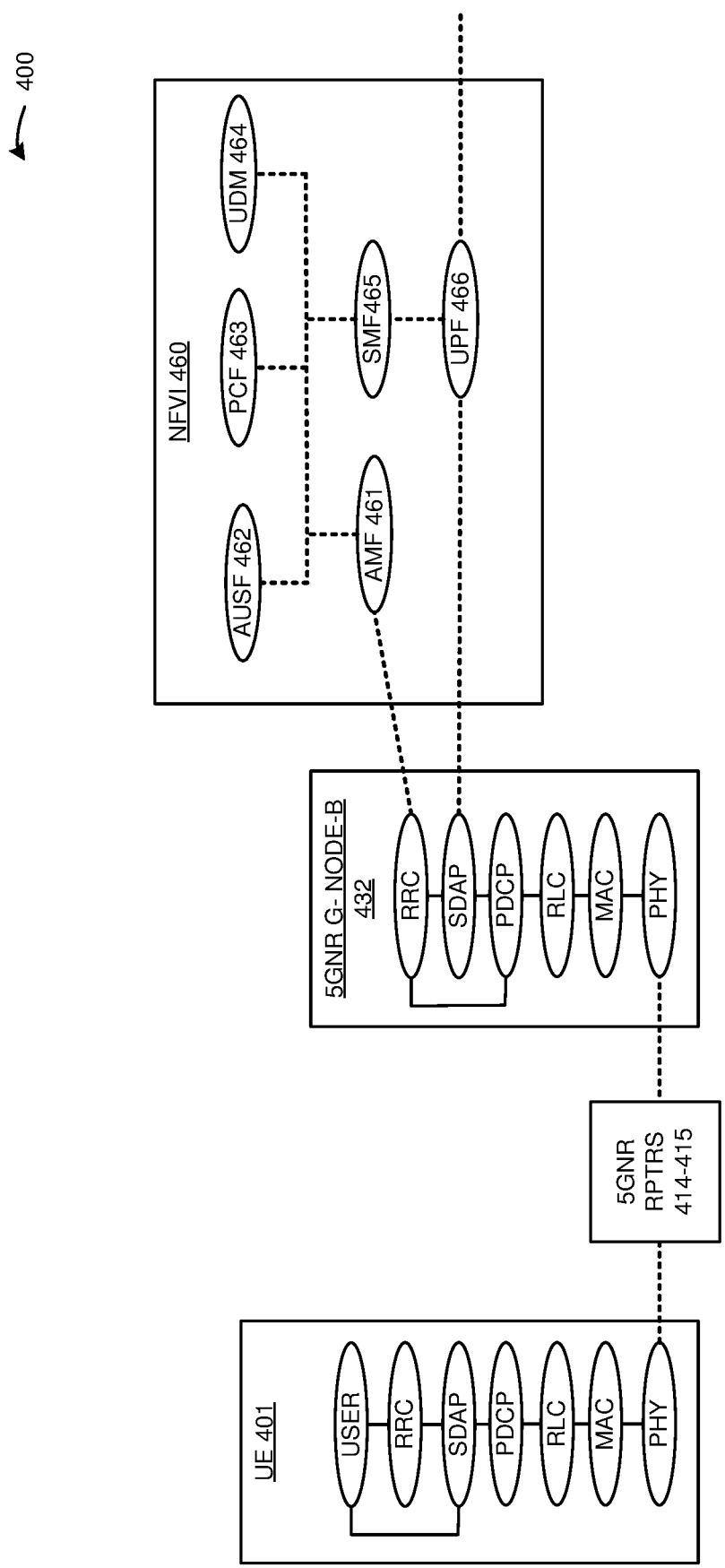
FIG. 10 illustrates the operation of the 5G network to serve the UE with the wireless data service over the 5GNR repeaters.

FIG. 10 illustrates the operation of 5G network 400 to serve UE 401 with the wireless data service over 5GNR repeaters 414-415. In 5GNR UE 401, a user application requests data communication. The 5GNR PHY detects signal strength for 5GNR repeater 414 and reports the signal strength to the 5GNR RRC. The 5GNR RRC attaches to the 5GNR RRC in 5GNR gNodeB 432 over 5GNR repeaters 414-415 and the 5GNR PDCPs, RLCs, MACs, and PHYs. The 5GNR RRC in 5GNR gNodeB 432 requests data services for 5GNR UE 401 in N2 signaling to AMF 461 over the backhaul links. AMF 461 interacts with SMF 465, AUSF 462, PCF 463, UDM 464, and typically other functions to authenticate and authorize 5GNR UE 401 for 5GNR data services. SMF 465 directs UPF 466 to serve UE 401 per the quality-of-service metrics and network addressing. AMF 461 transfers quality-of-service metrics and network addressing for UE 401 to the RRC in 5GNR gNodeB 432 in N2 signaling. The RRC in 5GNR gNodeB 432 transfers the quality-of-service metrics and network addressing to the RRC in UE 401 over 5GNR repeaters 414-415 and the PDCPs, RLCs, MACs, and PHYs. UPF 466 exchanges user data for UE 401 with external systems. UPF 466 exchanges the user data with the SDAP in 5GNR gNodeB 432. The SDAP in 5GNR gNodeB 432 exchanges the user data with the SDAP in 5GNR UE 401 over 5GNR repeaters 414-415 and the PDCPs, RLCs, MACs, and PHYs. The 5GNR SDAP in UE 401 exchanges the user data with the user applications.

The 5GNR PHY in UE 401 continues to detect and report signal strength for 5GNR gNodeBs (possibly over repeaters) to the 5GNR RRC. The 5GNR RRC reports the signal strengths to the 5GNR RRC in gNodeB 432. The 5GNR RRC in gNodeB 432 identifies the reported gNodeBs with adequate signal strength. The 5GNR RRC in gNodeB 432 identifies the number of repeaters between UE 401 and the gNodeBs with adequate signal strength. The 5GNR RRC in gNodeB 432 selects other gNodeBs when they have the adequate signal strength and the lowest number of 5GNR repeaters. The 5GNR RRC in gNodeB 432 directs the RRC in UE 401 to handover or reattach to the other gNodeB over the fewer number of 5GNR repeaters. The RRC in UE 401 responsively hands-over or reattaches to the other gNodeB over the fewer number of 5GNR repeaters.

Figure 11:
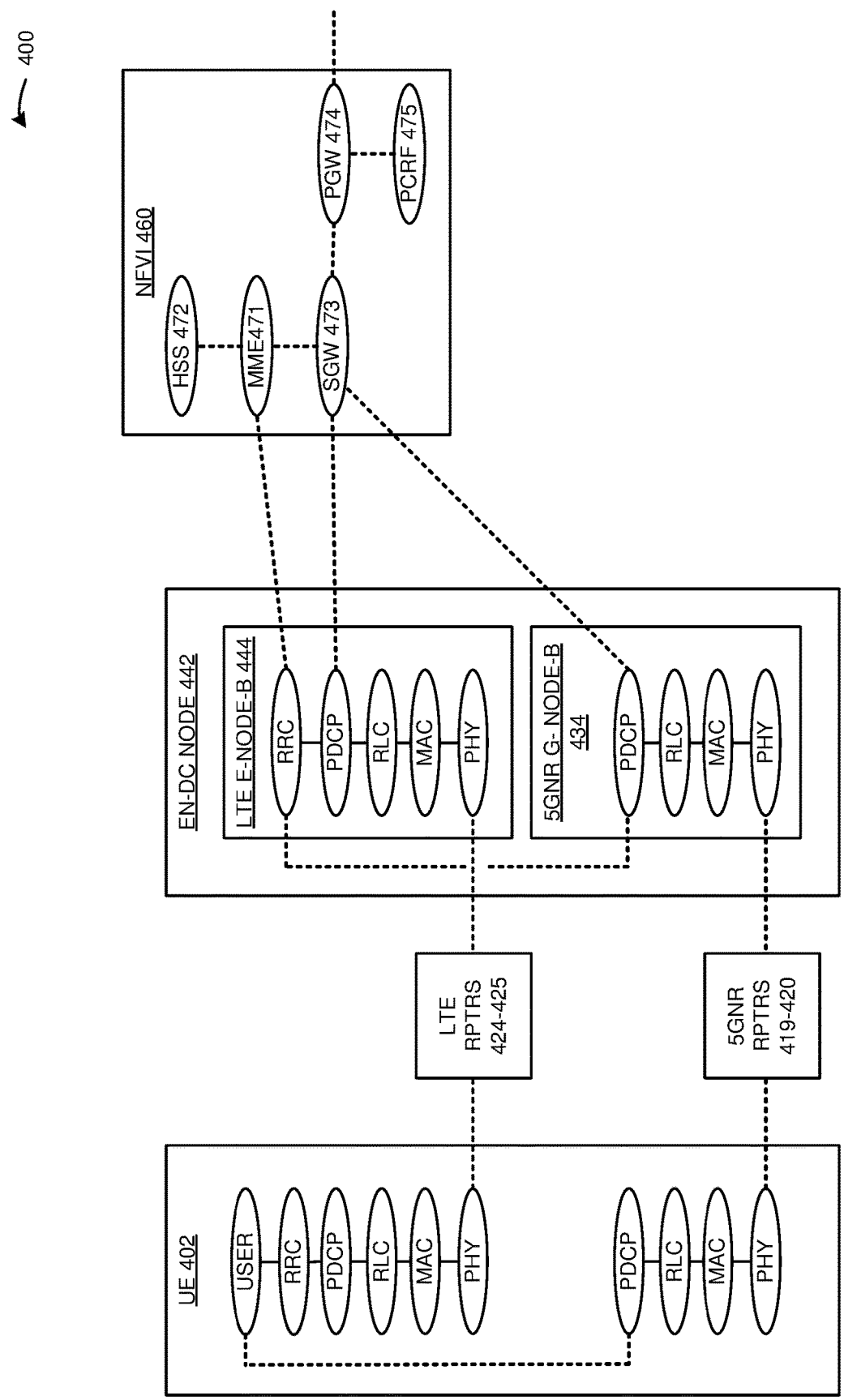
FIG. 11 illustrates the operation of the 5G network to serve the UE with the wireless data service over the 5GNR repeaters and the LTE repeaters.

FIG. 11 illustrates the operation of 5G network 400 to serve UE 402 with the wireless data service over 5GNR repeaters 419-420 and LTE repeaters 424-425. In UE 402, a user application requests data communication, and the LTE RRC attaches to the LTE RRC in LTE eNodeB 444 over LTE repeaters 424-425 and the LTE PDCPs, RLCs, MACs, and PHYs. The LTE RRC indicates 5GNR capability for UE 402 to the LTE RRC in LTE eNodeB 444. The LTE RRC in LTE eNodeB 444 transfers S1-MME signaling to MME 471 that requests data services and indicates the 5GNR capability for LTE UE 402. MME 471 interacts with HSS 472 to authenticate and authorize UE 402 for wireless data services by APNs—including 5GNR service. MME 471 transfers the APNs for UE 402 to PGW 474 over SGW 473. PGW 474 interacts with PCRF 475 to select QCIs and network addresses for UE 402 based on the APNs. PGW 474 transfers the APNs, QCIs, and addresses to MME 471 over SGW 473. MME 471 transfers the APNs, QCIs, and network address for UE 402 to the RRC in LTE eNodeB 444. The RRC in LTE eNodeB 444 transfers the APNs, QCIs, and network address to the LTE RRC in UE 402 over LTE repeaters 424-425 and the PDCPs, RLCs, MACs, and PHYs. PGW 474 exchanges the user data with SGW 473 which exchanges the user data with the PDCP in LTE eNodeB 444. The PDCP in LTE eNodeB 444 exchanges the user data with the LTE PDCP in UE 402 over LTE repeaters 424-425 and the RLCs, MACs, and PHYs. The LTE PDCP in UE 402 exchanges the user data with the user applications. In some examples, SGW 473 and PGW 474 are integrated together into an SAE GW in NFVI 460.

In response to the 5GNR service authorization, the LTE RRC in LTE eNodeB 444 directs the 5GNR PDCP in UE 402 to attach to 5GNR gNodeB 434 in EN-DC node 442. The 5GNR PDCP attaches to the 5GNR PDCP in 5GNR gNodeB 434 over 5GNR repeaters 419-420 and the 5GNR RLCs, MACs, and PHYs. The 5GNR PDCP in 5GNR gNodeB 434 requests 5GNR service for UE 401 from the LTE RRC in LTE eNodeB 444 over X2 signaling. The LTE RRC in LTE eNodeB 444 requests the 5GNR service for UE 402 from MME 471 over S1-MME signaling. MME 471 directs SGW 473 to serve UE 402 over 5GNR gNodeB 434. MME 471 transfers the APNs, QCIs, and network address for UE 402 to the RRC in LTE eNodeB 444. The RRC in LTE eNodeB 444 transfers the APNs, QCIs, and network address to the 5GNR PDCP in 5GNR gNodeB 434 over X2 signaling. The 5GNR PDCP in 5GNR gNodeB 434 in UE 402 transfers the APNs, QCIs, and network address to the 5GNR PDCP in UE 402 over repeaters 419-420 and the RLCs, MACs, and PHYs. SGW 432 exchanges the user data for UE 402 with the PDCP in 5GNR gNodeB 434. The PDCP in 5GNR gNodeB 434 exchanges the user data with the PDCP in 5GNR UE 401 over repeaters 419-420 and the RLCs, MACs, and PHYs. The 5GNR PDCP in UE 402 exchanges the user data with the user applications.

The LTE PHY and the 5GNR PHY in UE 402 continue to detect and report signal strength for NodeBs (possibly over repeaters) to the LTE RRC. The LTE RRC reports the signal strengths to the LTE RRC in eNodeB 444. The LTE RRC in eNodeB 444 identifies reported EN-DC eNodeBs that have adequate signal strength. The LTE RRC in gNodeB 444 identifies the number of repeaters between UE 401 and the EN-DC eNodeBs with adequate signal strength. The LTE RRC in eNodeB 444 selects other EN-DC eNodeBs when they have the adequate signal strength and the lowest number of LTE and/or 5GNR repeaters. The LTE RRC in eNodeB 444 directs the RRC in UE 402 to handover or reattach to the other EN-DC eNodeB over the fewer number of LTE repeaters and/or 5GNR repeaters. The LTE RRC in UE 402 responsively hands-over or reattaches to the other EN-DC eNodeB over the fewer number of LTE repeaters. The 5GNR PDCP in UE 402 responsively hands-over or reattaches to the other EN-DC gNodeB over the fewer number of 5GNR repeaters.

The wireless data network circuitry described above comprises computer hardware and software that form special-purpose network circuitry to serve wireless UEs over a lower number of wireless repeaters and improve wireless data service. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs over a lower number of wireless repeaters and improve wireless data service.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating wireless communication network to serve a wireless User Equipment (UE) with a wireless data service over wireless repeaters, the method comprising:
a serving access node wirelessly receiving UE signaling that indicates signal strengths for at least some the wireless repeaters; the serving access node determining amounts of the wireless repeaters between the wireless UE and individual target access nodes; the serving access node determining velocity for the wireless UE; the serving access node determining individual antenna characteristics for the wireless relays; when the velocity exceeds a threshold, the serving access node selecting a primary access node from the target access nodes based on the signal strengths the wireless repeater amounts, and the individual antenna characteristics and responsively transferring network signaling to the primary access node; the primary access node receiving the network signaling and responsively serving the wireless UE with the wireless data service; the primary access node transferring additional network signaling to a secondary access node; and the secondary access node receiving the additional network signaling and responsively serving the wireless UE with the wireless data service.

2. The method of claim 1 further comprising the serving access node determining amounts of other UEs that are served by the individual target access nodes and wherein the serving access node selecting the primary access node based on the signal strengths and the repeater amounts comprises selecting the primary access node based on the signal strengths, the repeater amounts, and the other UE amounts.

3. The method of claim 2 further comprising the serving access node determining performance metrics for the other UEs that are directly served by the individual target access nodes and wherein the serving access node selecting the primary access node based on the signal strengths, the repeater amounts, and the other UE amounts comprises selecting the primary access node based on the signal strengths, the repeater amounts, the other UE amounts, and the performance metrics.

4. The method of claim 2 further comprising the serving access node determining performance metrics for the other UEs that are indirectly served by the individual target access nodes over the wireless repeaters and wherein the serving access node selecting the primary access node based on the signal strengths, the repeater amounts, and the other UE amounts comprises selecting the primary access node based on the signal strengths, the repeater amounts, the other UE amounts, and the performance metrics.

5. The method of claim 2 wherein the serving access node determining the amounts of the other UEs comprises summing numbers of the other UEs directly served by the individual target access nodes with numbers of the other UEs indirectly served by the individual target access nodes over the wireless repeaters.

6. The method of claim 1 wherein the serving access node comprises a Fifth Generation New Radio (5GNR) gNodeB.

7. The method of claim 1 wherein the primary access node comprises a Fifth Generation New Radio (5GNR) gNodeB.

8. The method of claim 1 wherein the wireless repeaters comprise Fifth Generation New Radio (5GNR) repeaters.

9. The method of claim 1 wherein the primary access node comprises a Long Term Evolution (LTE) eNodeB and the secondary access node comprises a Fifth Generation New Radio (5GNR) gNodeB.

10. A wireless communication network to serve a wireless User Equipment (UE) with a wireless data service over wireless repeaters, the wireless communication network comprising:
a serving access node configured to wirelessly receive UE signaling that indicates signal strengths for at least some the wireless repeaters; the serving access node configured to determine amounts of the wireless repeaters between the wireless UE and individual target access nodes; the serving access node configured to determine velocity for the wireless UE; the serving access node configured to determine individual antenna characteristics for the wireless repeaters; when the velocity exceeds a threshold, the serving access node configured to select a primary access node from the target access nodes based on the signal strengths, the wireless repeater amounts, and the individual antenna characteristics and responsively transfer network signaling to the primary access node; the primary access node configured to receive the network signaling and responsively serve the wireless UE with the wireless data service; the primary access node configured to transfer additional network signaling to a secondary access node; and the secondary access node configured to receive the additional network signaling and responsively serve the wireless UE with the wireless data service.

11. The wireless communication network of claim 10 further comprising the serving access node configured to determine amounts of other UEs that are served by the individual target access nodes and wherein the serving access node is configured to select the primary access node based on the signal strengths, the repeater amounts, and the other UE amounts.

12. The wireless communication network of claim 11 further comprising the serving access node configured to determine performance metrics for the other UEs that are directly served by the individual target access nodes and wherein the serving access node is configured to select the primary access node based on the signal strengths, the repeater amounts, the other UE amounts, and the performance metrics.

13. The wireless communication network of claim 11 further comprising the serving access node configured to determine performance metrics for the other UEs that are indirectly served by the individual target access nodes over the wireless repeaters and wherein the serving access node is configured to select the primary access node based on the signal strengths, the repeater amounts, the other UE amounts, and the performance metrics.

14. The wireless communication network of claim 11 wherein the serving access node is configured to sum numbers of the other UEs directly served by the individual target access nodes with numbers of the other UEs indirectly served by the individual target access nodes over the wireless repeaters.

15. The wireless communication network of claim 10 wherein the serving access node comprises a same access node comprises a Fifth Generation New Radio (5GNR) gNodeB.

16. The wireless communication network of claim 10 wherein the primary access node comprises a Fifth Generation New Radio (5GNR) gNodeB.

17. The wireless communication network of claim 10 wherein the wireless repeaters comprise Fifth Generation New Radio (5GNR) repeaters.

18. The wireless communication network of claim 10 wherein the primary access node comprises a Long Term Evolution (LTE) eNodeB and the secondary access node comprises a Fifth Generation New Radio (5GNR) gNodeB.

* * * * *